C. MULLIN.
SPRING CLEVIS.
APPLICATION FILED JUNE 8, 1909.

944,899.

Patented Dec. 28, 1909.

Witnesses
Jas. F. McCathran
H. F. Riley

Inventor
Charles Mullin
By C. G. Siggers
Attorney

UNITED STATES PATENT OFFICE.

CHARLES MULLIN, OF CONWAY, NORTH DAKOTA.

SPRING-CLEVIS.

944,899.   Specification of Letters Patent.   Patented Dec. 28, 1909.

Application filed June 8, 1909. Serial No. 500,857.

*To all whom it may concern:*

Be it known that I, CHARLES MULLIN, a citizen of the United States, residing at Conway, in the county of Walsh and State of North Dakota, have invented a new and useful Spring-Clevis, of which the following is a specification.

The invention relates to a spring clevis for plows, etc.

The object of the present invention is to improve the construction of spring clevises for plows, etc., and to provide a simple, inexpensive and efficient spring clevis, adapted to relieve a plow of strain when it meets with substantial resistance, whereby the breakage of a plow point or mold board or the straining of the plow beam is prevented besides avoiding injury to the team.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

Figure 1:
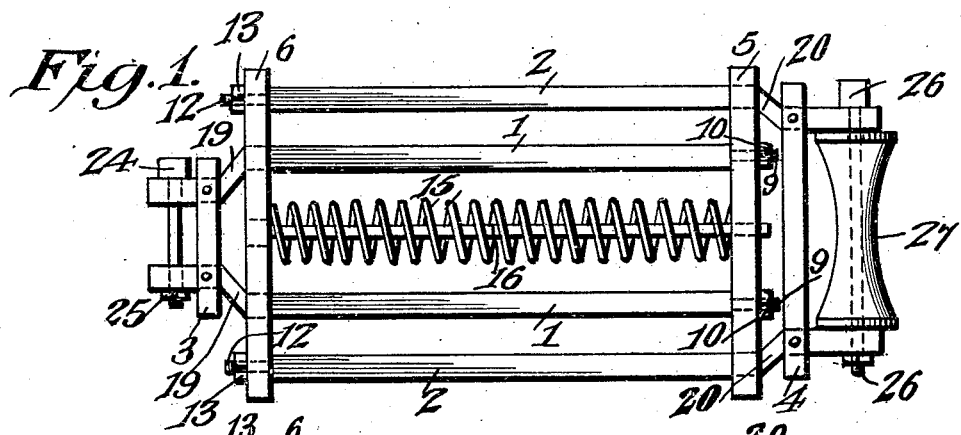
Figure 2:
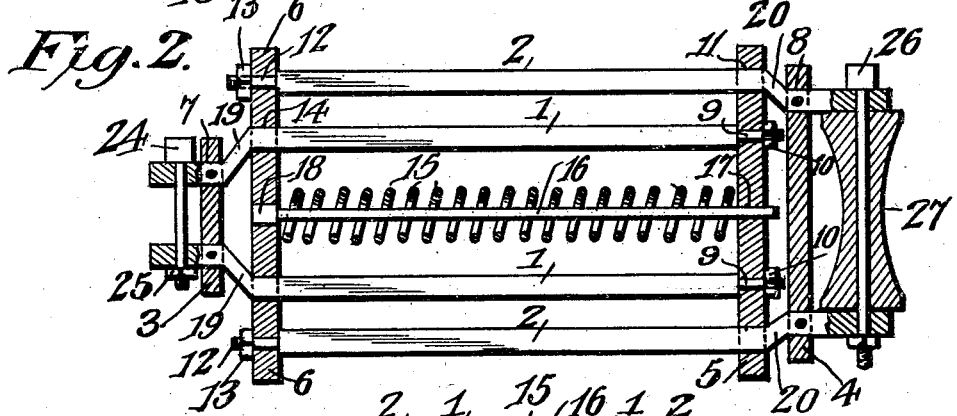
Figure 3:
Figure 4:
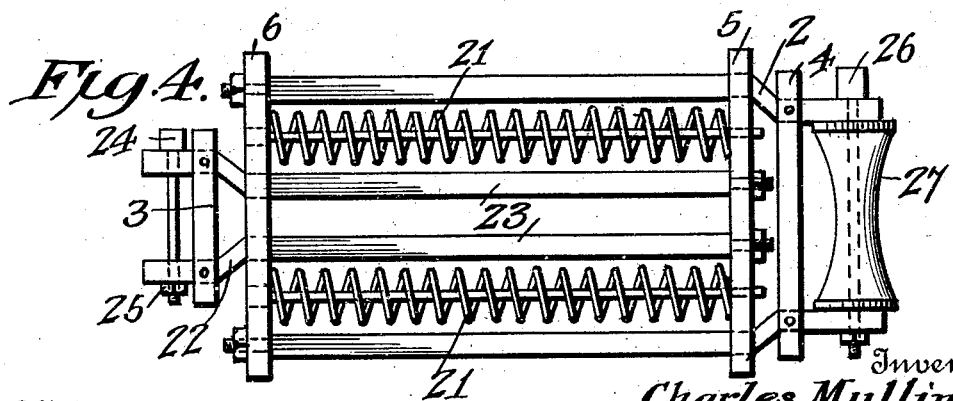

In the drawings:—Figure 1 is a side elevation of a clevis, constructed in accordance with this invention. Fig. 2 is a longitudinal sectional view of the same. Fig. 3 is a central transverse sectional view. Fig. 4 is a side elevation, illustrating another form of the invention.

Like numerals of reference designate corresponding parts in all the figures of the drawing.

The spring clevis comprises in its construction inner and outer reversely movable parallel side bars 1 and 2, connected at their outer portions by bars 3 and 4, respectively, and the inner ends of the side bars 1 and 2 are also connected by transverse bars 5 and 6. The outer transverse connecting bars 3 and 4, which are spaced from the adjacent terminals of the side bars 1 and 2 are provided with openings 7 and 8, through which the side bars 1 and 2 pass, and the connecting bars are secured to the same by suitable fastening means, but they may be cast integral therewith, if desired.

The inner terminals 9 of the inner side bars are reduced and threaded, and they pierce the transverse connecting bar 5 at opposite sides of the center of the same and are provided with nuts 10, which secure the cross bar 5 to the inner ends of the side bar 1. The outer portions of the transverse bar 5 are provided with openings 11, through which the outer side bars pass, and the connecting bar 5 and the outer side bars are relatively slidable. The outer side bars 2 have reduced inner ends 12, piercing the terminal portions of the connecting bar 6 and threaded to receive nuts 13, which secure the connecting bar 6 to the inner terminals of the side bars. The connecting bar 6 is provided at opposite sides of its center with openings 14 to slidably receive the inner side bars.

One or more coiled springs 15 may be interposed between the inner connecting bars to resist the relative slidable movement of the two frames, formed by the inner and outer side bars and their respective connecting bars.

In the embodiment illustrated in Figs. 1 to 3 inclusive, a single coiled spring 15 is employed and is mounted on a longitudinal rod 16, secured at its rear end to the cross bar 6 and having its front end passed through a central opening 17 of the cross bar 5. The rear end of the rod 16 is provided with a head 18, which is suitably secured in a central opening of the cross bar 6, but the rod 16 may be attached to the latter in any other suitable manner. The spring 15 is located between the inner parallel side bars, which are provided with angular bends 19, located adjacent to the outer connecting bar 3. These bends properly space the inner portions of the bars to arrange the same properly with relation to the coiled spring. The outer side bars are provided adjacent to the connecting bar 4 with corresponding angular bends 20 for a similar purpose.

In the embodiment of the invention shown in Fig. 4, a pair of coiled springs 21 is employed, the springs being located between the inner and outer side bars, and the angular bends 22 of the inner bars 23 being diverged rearwardly, while the said bends 19 converge rearwardly. A third spring may, if desired, be arranged between the inner bars 23. The number and strength of the springs may be varied to suit the character of the plow and the number of horses or other animals constituting the team, and when a plow strikes a solid stone, the springs will yield sufficiently to enable the team to be backed without subjecting the plow to a second strain, which usually results in injuring the plow point, mold board or beam.

The outer or rear terminals of the inner side bars are provided beyond the connecting bars 3 with perforations for the reception of a pin 24 for enabling the clevis to be connected with the front end of a plow beam. The pin 24, which is provided at its upper end with a head, may be threaded at its lower end to receive a nut 25, or it may be retained in place by a key, or other suitable fastening means. The outer or front ends of the outer side bars 2 are provided with perforations for the reception of a pin 26 for enabling the clevis to be connected with an evener or draft device. The pin 26, which is constructed similar to that before described, may receive a concave roller or pulley 27, adapted to permit the chain of an evener to be passed readily around it. When the clevis is subjected to strain, the frames slide on each other and the springs cushion both the plow and the draft animals and prevent the same from being injured.

Having thus fully described my invention, what I claim as new and desire to secure by Letters Patent, is:—

1. A clevis of the class described including inner and outer reversely slidable side bars arranged in the same plane, outer connecting bars located adjacent to the front and rear terminals of the side bars and spacing the same, front and rear inner connecting bars secured to the terminals of the inner and outer side bars, the front connecting bar being provided with openings slidably receiving the outer side bars and the inner rear connecting bar having similar openings slidably receiving the inner side bars, and a spring interposed between the inner connecting bars and arranged to be compressed by the sliding movement of the side bars.

2. A clevis of the class described including inner and outer reversely slidable side bars arranged in the same plane, outer connecting bars located adjacent to the front and rear terminals of the side bars and spacing the same, front and rear connecting bars secured to the terminals of the inner and outer side bars, the front connecting bar being provided with openings slidably receiving the outer side bars, and the inner rear connecting bar having similar openings slidably receiving the inner side bars, a spring interposed between the inner connecting bars and arranged to be compressed by the sliding movement of the side bars, and a supporting rod fixed to one of the inner connecting bars and slidable through the other connecting bar.

3. A clevis of the class described including inner and outer reversely slidable bars arranged in the same plane, outer connecting bars located adjacent to the front and rear terminals of the side bars and spacing the same, front and rear inner connecting bars secured to the terminals of the inner and outer side bars, the inner front connecting bar being provided with openings slidably receiving the outer side bars, and the inner rear connecting bar having similar openings slidably receiving the inner side bars, a spring interposed between the inner connecting bars and arranged to be compressed by the sliding movement of the side bars, front and rear pins piercing the front and rear terminals of the side bars beyond the outer connecting bar, and a concave pulley mounted on the front pin.

4. A clevis of the class described including reversely slidable inner and outer side bars arranged in pairs and provided near their outer ends with angular bends, front and rear outer transverse bars connecting the side bars at the said bends, front and rear inner transverse bars secured to the inner terminals of the inner and outer side bars, the inner front transverse bar having openings slidably receiving the outer side bars and the rear inner transverse bars being also provided with openings slidably receiving the inner side bars, a spring interposed between the inner transverse bars, a rod supporting the spring and secured to one of the inner transverse bars and slidable through the other inner transverse bar, and connecting means carried by the front and rear terminals of the side bars and located beyond the outer transverse bars.

In testimony, that I claim the foregoing as my own, I have hereto affixed my signature in the presence of two witnesses.

CHARLES MULLIN.

Witnesses:
 CHARLES A. DAILY,
 THOMAS P. DAILY.